(12) United States Patent
Rhoads, II et al.

(10) Patent No.: US 6,574,653 B1
(45) Date of Patent: Jun. 3, 2003

(54) BLACKBOARD-CENTRIC LAYERED SOFTWARE ARCHITECTURE

(75) Inventors: Thomas Edward Rhoads, II, Williston, VT (US); Keith Patrick Darwin, Ferrisburg, VT (US); Mark Robert Chaffee, Panton, VT (US); Harold Frederick Clark, Jr., Starksboro, VT (US)

(73) Assignee: Simmonds Precision Products, Inc., Akron, OH (US)

( * ) Notice: Subject to any disclaimer, the term of this patent is extended or adjusted under 35 U.S.C. 154(b) by 147 days.

(21) Appl. No.: 09/692,497

(22) Filed: Oct. 19, 2000

Related U.S. Application Data

(62) Division of application No. 08/997,137, filed on Dec. 23, 1997, now Pat. No. 6,256,679.

(51) Int. Cl.[7] ............................................. G06F 17/00
(52) U.S. Cl. ........................... 709/1; 709/310; 244/1 R
(58) Field of Search ......................... 709/315, 1, 310; 244/117, 1 R

(56) References Cited

U.S. PATENT DOCUMENTS

| | | | |
|---|---|---|---|
| 4,208,906 A | | 6/1980 | Roberts, Jr. |
| 4,976,377 A | | 12/1990 | Higuchi et al. |
| 4,987,888 A | | 1/1991 | Funabashi et al. |
| 5,094,213 A | | 3/1992 | Dudek et al. |
| 5,207,099 A | | 5/1993 | Baker |
| 5,273,019 A | | 12/1993 | Matthews et al. |
| 5,293,553 A | | 3/1994 | Dudek et al. |
| 5,370,535 A | * | 12/1994 | Prendergast ............ 273/148 B |
| 5,412,756 A | | 5/1995 | Bauman et al. |
| 5,474,261 A | | 12/1995 | Stolarczyk et al. |
| 5,524,599 A | * | 6/1996 | Kong et al. ................ 123/682 |
| 5,535,135 A | | 7/1996 | Bush et al. |
| 6,438,468 B1 | * | 8/2002 | Muxlow et al. ............... 701/3 |

FOREIGN PATENT DOCUMENTS

| | | |
|---|---|---|
| DE | 3537088 C | 4/1987 |
| GB | 2289542 A | 11/1995 |
| WO | WO 94/00815 | 1/1994 |

OTHER PUBLICATIONS

Almanzor et al. "The Modeling Methodology, Model Specifications and Development of CASI: CASE/Architecture Simulation Integration." ACM. 1993.*
Marsh et al. "Object–oriented Management of Real–Time Data in Integrated Avionics Architectures." IEEE. 1993.*
Clark, Victor. "Information Fusion Architectures for Next Generation Avionics Systems." IEEE. May 1996.*
BF Goodrich Article entitled: "The Health System That Monitors and Acts . . . ".
(GOTO) Goto Y., et al. "CMU Sidewalk Navigation System: A Blackboard–Based Outdoor Navigation System Using Sensor Fusion with Colored Range Images". IEEE. 1986.
Buteau, Brandon L. "A Generic Framework for Distributed Cooperating Blackboard Systems". ACM. 1990.

* cited by examiner

*Primary Examiner*—Alvin Oberley
*Assistant Examiner*—Lewis A. Bullock, Jr.
(74) *Attorney, Agent, or Firm*—David R. Percio; Calfee, Halter & Griswold LLP

(57) ABSTRACT

A computer software architecture for an embedded computer system. The architecture includes a hierarchy of software object classes. One classification includes a common information blackboard object. Data is written to the blackboard object by processes in a protected manner, and is otherwise globally readable by all processes. A run-time executive is provided to schedule and coordinate processes. Processes register with the run-time executive at start-up. One process can know the existence and generation of data by another process. The architecture is layered in increasing levels of system abstraction. In one embodiment, the embedded system is an airborne fuel gauging subsystem.

11 Claims, 2 Drawing Sheets

Microfiche Appendix Included
(2 Microfiche, 153 Pages)

LAYERED SOFTWARE ARCHITECTURE

RUN-TIME EXECUTIVE

BLACKBOARD-CENTRIC LAYERED SOFTWARE ARCHITECTURE

This application is a divisional of application(s) application Ser. No. 08/997,137 U.S. Pat. No. 6,256,679, filed on Dec. 23, 1997.

A Microfiche Appendix consisting of 2 sheets (153 total frames) of microfiche is included in the parent U.S. application Ser. No. 08/997,137, U.S. Pat. No. 6,256,679, the contents of which are hereby incorporated herein by reference. The Microfiche Appendix included in the parent application contains material which is subject to copyright protection. The copyright owner has no objection to the facsimile reproduction by anyone of the Microfiche Appendix, as it appears in the Patent and Trademark Office patent files or records, but otherwise reserves all copyright rights whatsoever.

BACKGROUND OF THE INVENTION

The present invention relates to computer system software architectures and more particularly to a layered, object-oriented software architecture for use in embedded computer systems.

Programming of computer systems is commonly achieved through computer software that is stored and executed by the computer in a predefined manner to achieve the intended operation or functionality of the computer system. Many forms of programming languages exist that can be used to describe specific operations or functions, which are then communicated to the computer system in a known manner to realize the intended operation or functionality. Even in rudimentary computer systems, certain rules exist that create an environment for such programming. Within the particular environment, a skilled programmer can develop computer software programs for execution on the computer system. Computer systems that require some form of programmed control should include a framework of the environment for such programming.

One form of computer programming technique or type of computer language that has become popular recently is called object-oriented programming. Through the creation of a hierarchy of software "objects" a skilled programmer can describe the basic and more complicated functions intended for a target computer system. Objects are typically instances of physical or logical entities in the computer system. Real world objects are typically used to model the system domain, and non-real world objects are used as modeling tools. Objects are also commonly grouped into classes of related objects, and each object is therefore an instance of an object class. Some presently known object-oriented programming languages include Ada, C++, Smalltalk, and Java to name a few. Programs written in these or other object-oriented languages operate within a pre-defined framework or environment to control various computer systems. A library of objects thus represents a collection of self-contained software routines for the processes and operations of the intended computer system. Basic objects that exist for rudimentary functions can be combined through software programs to achieve higher levels of functionality.

Embedded computer systems have their own programming needs based of the hardware components of each specific system. Typical airframe or aircraft environments include a host of electronic components and systems that are used in the operation of the aircraft. Examples of certain electrical subsystems include flight control, engine monitoring, cabin environmental control and fuel system gauging, to name a few. One important function in the operation of any aircraft is a determination of the remaining fuel quantity available for the engines. Many techniques exist for the gauging or measurement of fuel quantity in an airplane. Several forms of sensors are known for measuring fuel levels, as well as critical flight information, that can be used in the determination of fuel quantity remaining in a fuel tank. More commonly, invasive sensors are deployed within a fuel tank that are used to measure fuel quantity through height and volume measurements. Invasive sensors, however, may introduce unwanted risks to an aircraft including, but not limited to, introducing electrical energy within the fuel tank. Non-invasive sensors in the fuel tank may be used to aid in a determination of fuel quantity. Such non-invasive sensors avoid some of the above risks and include, for example, accelerometers and transducers, to name a few. With the use of external, non-invasive sensors, maintenance of the fuel gauging system is also easier.

With the existence of many sophisticated electrical systems and subsystems in an aircraft, attempts have been made to control the operation of such electronics through computers. Both independent and centralized computer systems have been developed to control the operation of certain large and small electronic systems within an aircraft. Computer systems are also known for the determination of fuel quantity remaining in an aircraft fuel tank. Existing computer systems, however, are rudimentary and may not allow for the use of sophisticated software techniques such as those described above. What is lacking in the art is a sophisticated computer system environment for use in control of aircraft utilities in general. The prior art also lacks the advantage of an object-oriented software architecture that can easily be used in gauging the remaining fuel in an aircraft fuel tank.

SUMMARY OF THE INVENTION

In view of the above, the invention provides a blackboard-centric layered software architecture for an embedded airborne fuel gauging subsystem. According to one aspect of the invention, a computer software architecture is provided for isolation of critical system responsibilities in an aircraft fuel gauging system. The architecture includes a determination layer of software objects having a sensor fusion authority, a data fusion authority and a determination controller. The determination layer of software objects is coupled to a blackboard layer of software objects for communicating information between object layers. A virtual airframe layer of software objects is also provided having a resource data manager, and a bus item and common sensor. The virtual airframe layer of software objects is coupled to the blackboard layer of software objects, as well as a virtual processor layer of software objects. The virtual processor layer of software objects has at least one processor utility application programming interface, and a bus message driver and analog to digital driver. The virtual processor layer of software objects is operative to receive information over a standard interface. A run-time executive is then coupled to the determination, virtual airframe and virtual processor layers of software objects, and is operative to schedule execution threads.

In another aspect of the invention, a method is provided for scheduling tasks in a computer software environment. The method includes providing a run-time executive service for utilization by client processes. The run-time executive service is operative to schedule processing tasks within the computer software environment. Scheduling requests received from the client processes are submitted to the run-time executive. A schedule is built that incorporates the scheduling requests received from all client processes. A work list is then built from the schedule at the start of each major process cycle, where the work list comprises a list of tasks to be performed during a current process cycle. System calls are then made to perform currently scheduled tasks.

According to another aspect of the invention, a run-time executive for scheduling tasks in computer software environment is provided. The run-time executive includes means for providing a run-time executive service for utilization by client processes. The run-time executive service is operative to schedule processing tasks within the computer software environment. Means are provided for submitting scheduling requests received from the client processes to the run-time executive. Means are also provided for building a schedule that incorporates the scheduling requests received from all client processes. Means for building a work list from the schedule at the start of each major process cycle are also provided, where the work list comprises a list of tasks to be performed during a current process cycle. Means for making system calls to perform currently scheduled tasks are also included.

Yet another aspect of the invention provides a virtual airframe layer of software objects. The virtual airframe layer of software objects includes a resource data manager operative to initialize and reconfigure adaptable resource data. A bus item coupled to a virtual processor is included, where the bus item is operative to communicate common bus data to the virtual processor. A common sensor coupled to at least one physical airframe sensor is also provided that is operative to communicate sensor data and features to the virtual processor.

In view of the above, the present invention provides a sophisticated computer system environment for use in aircraft control in general, and more particularly, an object-oriented software architecture that can easily be used in a variety of airplanes and aircraft. The use of an object-oriented software architecture separates hardware concerns from software concerns, and sensor processing from sensor fusion. This architecture also improves fault tolerance, and provides strong support for reuse of the software objects. In addition, portability of the software is enhanced by providing a common environment/architecture across different processors and platforms, as well as across different airframes. This further promotes reuse with other utility systems such as, for example, a health utilities monitoring system ("HUMS"). The software architecture also makes changes to the software programming easy to achieve by providing for iterative development and maintenance, as well as simplified tuning of the software for improved system performance.

The implementation of different layers of software objects also isolates critical responsibilities of the computer/ airframe system. The lower layers of the software architecture abstract the computer system from the airframe environment. Accordingly, the higher layers of software objects need only be concerned with gauging fuel through a determination of fuel mass. This software architecture is also more understandable to the user/programmer because it graphically represents the system as it is viewed by the typical user/programmer. Moreover, the use of a determination layer of software objects improves system or overall fault tolerance from the loss of sensor data. The particular software architecture described above also allows processes to be executed in either a distributed or centralized manner.

These and other features and advantages of the invention will become apparent upon a review of the following detailed description of the presently preferred embodiments of the invention, taken in conjunction with the appended drawings.

DETAILED DESCRIPTION OF THE PRESENTLY PREFERRED EMBODIMENTS

The presently preferred embodiment for use of the invention is an airborne embedded fuel estimation subsystem. As those skilled in the art will appreciate, however, the blackboard-centric layered software architecture of the invention can be used in any number of embedded computer systems without departing from the spirit and scope of the invention. For example, the layered software architecture can be used in any of the other aforementioned aircraft utility subsystems, as well as non-aircraft computer environments like the HUMS.

In the preferred embodiment, the software architecture is layered in an hierarchical manner, with each layer consisting of a different classification of software objects. The hierarchical layers allow the concerns of the processor, the aircraft, and the state estimation algorithms used to calculate fuel mass to be separated. As discussed in more detail below, the layers share dynamic data through a common virtual blackboard, which is also represented and expressed as a classification of objects. The blackboard provides a common interface to store and retrieve data, which simplifies the communications among the different architectural layers.

Processing between and among the hierarchical layers is coordinated and controlled by an executive function. Preferably, the executive is capable of performing parallel processing operations, but the executive can also be implemented in a serial manner. In the preferred, multi-threaded environment, sensed data is processed during each processing thread and transformed to fuel mass measurements using appropriate state estimation algorithms. Examples of such state estimation algorithms are described in detail in co-pending application Ser. No. 08/996,858 U.S. Pat. No. 6,157,894, entitled "Liquid Gauging Using Sensor Fusion and Data Fusion" filed on even date herewith and commonly owned by the assignee of the present application, the contents of which are hereby expressly incorporated herein by reference.

Figure 1:
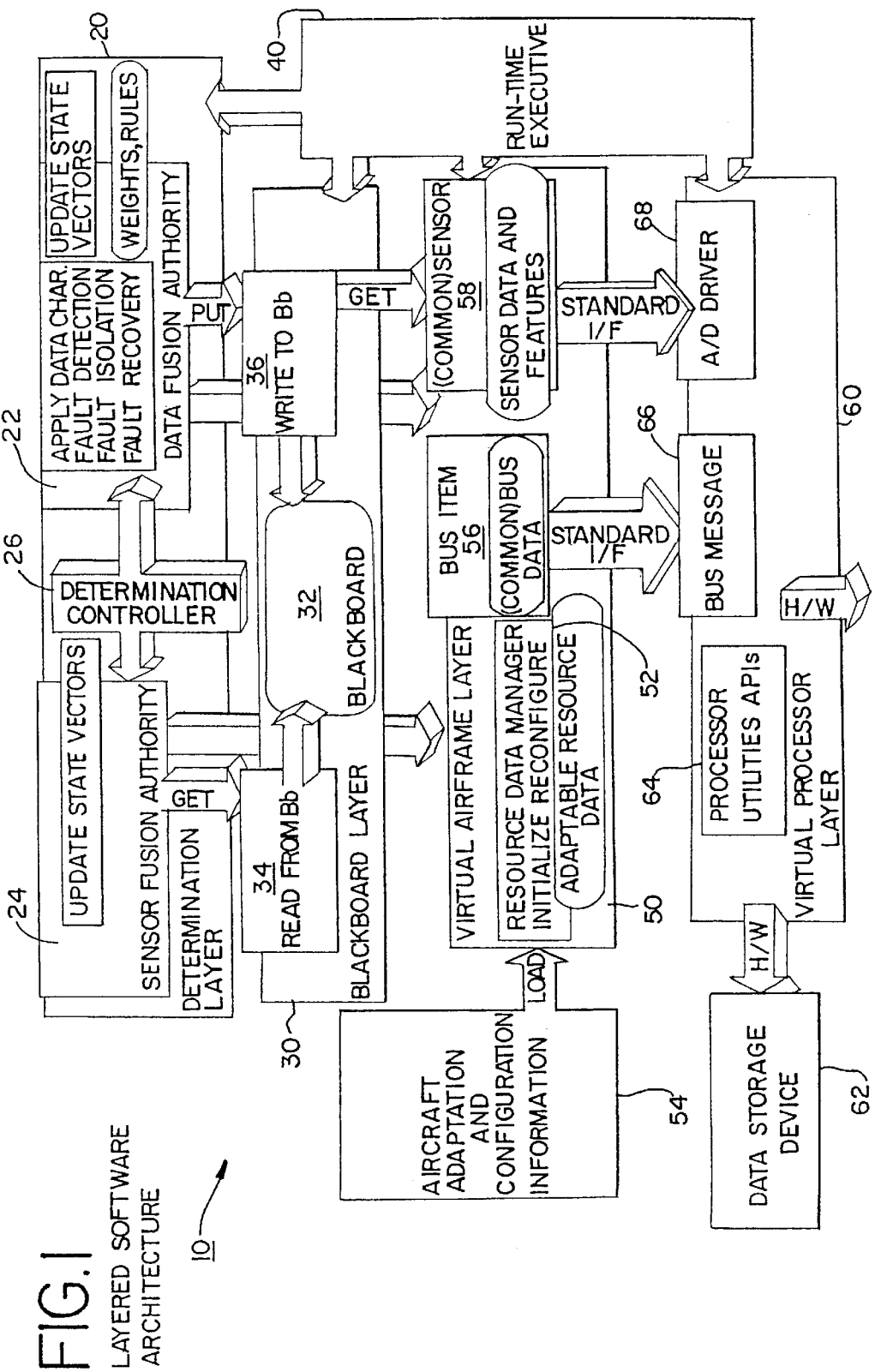
FIG. 1 illustrates a presently preferred layered software architecture map according to the invention.

The overall relationship among the layers of software objects is shown graphically in the architecture map provided in FIG. 1. Each arrow shown in FIG. 1 represents interfaces between layers, or between objects within and among layers. The arrows represent the following relationship between components (layers or objects): The component at the pointed end of the arrow is known to exist by the component at the origin end of the arrow across each interface. For example, the bus item 56 in the virtual airframe layer 50 knows that there exists a bus message object 66 in the virtual processor layer 60. A more detailed description of each layer of software objects shown in FIG. 1, is provided below.

Referring to FIG. 1, a determination layer of software objects 20 exists at the top of the hierarchy of software object layers 10. (As indicated above, each layer of software objects comprises a class of related objects.) A virtual processor layer of software objects 60 correspondingly exists at the low end of the hierarchy. The blackboard layer of software objects 30, and a virtual airframe layer of software objects 50 are disposed between the top and bottom of the architecture. The elements of each of these layers, as well as the coordination of their processes and operations by the executive 40, is discussed in greater detail below.

In the preferred embodiment of the invention, the determination layer includes a data fusion authority 22 and a sensor fusion authority 24. Each of these elements is employed in the calculation of remaining fuel mass in the fuel tank(s) of an aircraft in the preferred embodiment. As those skilled in the art will appreciate, however, different functions and elements can replace the data fusion and sensor fusion authorities 22, 24 to perform processing and operations in other target environments. A determination controller 26 is also shown in FIG. 1. The determination controller 26 is operative to coordinate interactions between the data fusion authority 22 and the sensor fusion authority 24. The determination layer 20 is also coupled to the run-time executive 40, and is controlled by the run-time executive 40 as described in more detail below.

According to the preferred embodiment, the sensor fusion authority 24 updates state vectors in analyzing sensor data to determine fuel mass. The sensor fusion authority 24 also communicates with the blackboard layer 30 and virtual airframe layer 50. The sensor fusion authority 24 preferably communicates with the blackboard layer 30 by reading information from the blackboard 32. Similarly, the data fusion authority 22 updates state vectors while coordinating airframe data in determining fuel mass. The data fusion authority 22 thus applies data characteristics, and performs fault detection, isolation and recovery. The data fusion authority 22 also communicates with the blackboard layer 30 and virtual airframe layer 50. The data fusion authority 22 preferably communicates with the blackboard layer 30 by writing sensor data to the blackboard 32. As described further below, in the preferred embodiment all processes can globally read data contained within the blackboard, but each process can only write to a protected area of the blackboard layer 30 associated with that process.

The blackboard layer of software objects 30 shown in FIG. 1 is coupled to the determination layer 20 as described above. The blackboard layer 30 is also coupled to the run-time executive 40 and the virtual airframe layer 50. The blackboard layer 30 includes the blackboard object 32 itself along with a read function 34 and write function 36. In the preferred embodiment, the blackboard object 32 comprises a partitionable memory, which can take the form of any mass memory storage device from semiconductor readable/writable memory to magnetic or optical storage media. Both the read function 34 and the write function 36 allow for the communication between the blackboard 32 and the determination layer 20. The read function 34 communicates information between the sensor fusion authority 24 and the blackboard 32. Conversely, the write function stores sensor data received from the data fusion authority 22 into the blackboard 32.

The blackboard layer 30 of abstraction separates fuel mass determination from the airframe and processor specific logic. As a result, the determination of fuel mass can be performed in real time using the results from real time data acquisition associated with the virtual processor layer 60 (e.g., bus interface, sensor interface, etc.) and the virtual airframe layer 50 (e.g., processing and transforming inputs from external interfaces). The run-time executive 40 coordinates processing in a deterministic, preferably cyclic manner. The execution of process threads are also scheduled by the run-time executive 40 in a preferably serial manner, as described in further detail below.

The virtual airframe layer of software objects 50 receives aircraft adaptation and configuration information from a storage device 54 located on the aircraft. As those skilled in the art will appreciate, however, this information can be received directly from the various sensors disposed about the aircraft or other aircraft componentry through a buffer or other common interface. A universal sensor interface may be used for such common interface as described in more detail in copending application Ser. No. 08/997,271, U.S. Pat. No. 6,115,654, entitled "Universal System Interface System and Method", filed on even date herewith and commonly owned by the assignee of the present application, the contents of which are hereby incorporated herein by reference. The information received, whether from the storage device 54 or directly, is loaded into a resource data manager 52 within the virtual airframe layer 50. The resource data manager 52 initializes and reconfigures adaptable resource data received from the various aircraft sensors disposed about the airframe.

The virtual airframe layer 50 thus includes a sensor object 58 that acts as a common sensor for all other (relevant) sensor data and features within the airframe. This common sensor 58 receives information written to the backboard layer 30. The common sensor 58 also communicates data via a standard interface to an analog to digital (A/D) driver 68 located in the virtual processor layer 60. The virtual airframe layer 50 also includes a bus item 56 that communicates relevant bus data received from the aircraft through a standard interface to a bus message function 66 in the virtual processor layer 60. As with the above two layers, the virtual airframe layer 50 is also coupled to and controlled by the run-time executive 40.

The lowest layer of software objects is the virtual processor layer 60. The virtual processor layer 60 is closely coupled to the actual computer system platform housed within the target airborne fuel gauging subsystem. As mentioned above, the virtual processor layer 60 abstracts the hardware processor from the embedded computer system for the software architecture, and thus is viewed as the lowest level of the software architecture hierarchy. The virtual processor also communicates data to a data storage device 62 in the embedded computer system, as well as providing other typical inputs and outputs to the embedded computer system (not shown). The virtual processor layer 60 further includes a variety of processor utility application programming interfaces (API's) 64 necessary for the operation of application software on the embedded computer system in a manner generally known in the art. The virtual processor layer also includes the bus message function 66 and the A/D driver 68 mentioned above, and is controlled via the run-time executive routine 40.

Figure 2:
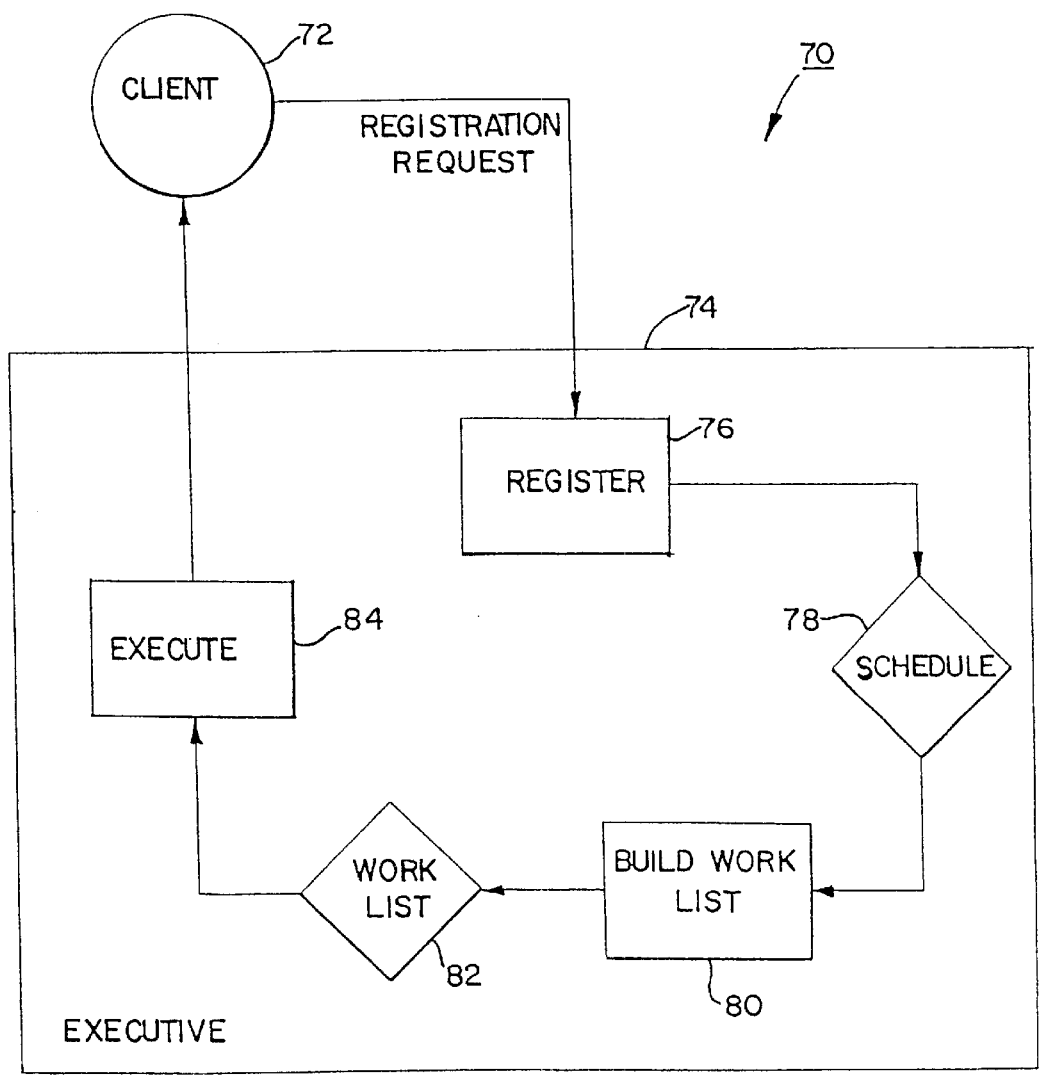
FIG. 2 shows a presently preferred process flow chart for the preferred run-time executive of the invention shown in FIG. 1.

Referring now to FIG. 2, a flowchart 70 of the presently preferred algorithm for the run-time executive 40 is shown. As described above, the run-time executive 40 coordinates sequencing and operation of the processes executing within the system. In the preferred embodiment, these processes include those used to calculate fuel mass in an airborne fuel tank, as well as the infrastructure processes inherent in the architecture itself. The run-time executive 40 performs two types of operations to coordinate all processes—one is performed at system start-up and the other is performed during run-time of the system. At start-up time, all processes are required to "check in" or register with the executive at step 76. This check in procedure allows the later scheduling of tasks by the executive 74 at step 78. At check in, each process identifies itself to the executive and registers with the executive the various tasks and operations the process will perform.

At run-time, each process is viewed as a "client" 72 of the executive and communication with the executive process 74 is initiated at step 72. The previously registered requests, which come from the then active processes within the system, are scheduled by the executive at step 78 in the presently preferred cyclical, multi-threaded manner described above. From this schedule, the executive 74 builds a work list of tasks at step 80, and the work list sequence is implemented at step 82. At step 84, therefore, the various tasks of the various processes running on the target system are executed, preferably by background system calls initiated by the executive 74. Upon completion of each task, control is returned to the executive at step 84 for further processing.

A general description of the functionality of each of the various layers of the software architecture is provided below.

The Virtual Processor Layer

As mentioned above, the virtual processor layer 60 hides the underlying implementation of the specific processor being used in the embedded aircraft subsystem. The purpose of this layer is to provide a modular design to mask the processor specific details of a given computer system by providing common interface services to other programs when they access the processor. Thus, in the preferred embodiment the virtual processor layer 60 is tailored to the specific embedded processor housed within the aircraft fuel gauging subsystem. The virtual processor layer 60 also performs resource date initialization and access.

Those skilled in the art will appreciate that various processors can be modeled by the virtual processor layer 60 without departing from the spirit and scope of the invention. Examples of commonly known processors include, but are not limited to, the Intel Corporation line of 80×86 and Pentium microprocessors, and the 68000 family of microprocessors manufactured by Motorola, Inc., as well as various other central processing units, digital signal processors and reduced instruction set processors, to name a few.

In the virtual processor layer 60, the provision of common services separates any airframe specific processing performed from how the processing is actually handled by the particular processor employed in the embedded computer system. In this manner, a new processor can be introduced into the embedded computer system without resulting in changes to the various other layers and objects that use these services.

The Virtual Airframe Layer

The virtual airframe layer of software objects 50 abstracts software from the airframe in a manner similar to how the virtual processor layer 60 abstracts software about the processor. Thus, common services provided by the virtual airframe layer 50 separate any airframe specific processing performed from how that processing is handled in a particular aircraft. The virtual airframe layer 50 also performs resource data initialization and access. In the preferred embodiment, resource data is static data that is used to adapt the system to a new airframe platform.

The Blackboard Layer

The blackboard layer of software objects 30 provides the dynamic data store referred to above as the blackboard object 32 along with all necessary blackboard support. Blackboard support includes writing to and reading from the blackboard 32 as primary tasks. The blackboard preferably limits write access but not read access for processes operating within the architecture, as mentioned above. The blackboard 32 is therefore preferably readable by all (relevant) processes as reflected in FIG. 1.

The use of a blackboard provides added flexibility and extensibility for a knowledge-based system, such as the preferred embodiment, which allows changes to the choice of algorithms and improves the ability to apply new algorithms as needed to support new or changing configurations. The blackboard 32 is thus a programming structure that coordinates the cooperative processing of several knowledge sources in solving a problem, e.g., fuel mass determination. Conceptually, therefore the blackboard 32 is a kind of specialized implementation and use of a database. The blackboard 32 stores a combination of (a) the problem to be solved, (b) initial data, (c) intermediate data, and (d) alternative solutions. This information is again preferably readable by all of the knowledge resources requiring access to such information.

The blackboard 32 also preferably controls access and buffering to its repository. As mentioned above, the knowledge sources are preferably provided limited write access through a preferred blackboard communication control. The architecture ensures that there is no shared write access to any part of the blackboard repository. Each process preferably receives and employs its own dedicated repository space for storage and manipulation of relevant data. The blackboard 32 further controls communication between and among layers and objects by controlling the event mechanism that initiates processing by each knowledge source. The event mechanism is represented by the arrows provided in FIG. 1, and is preferably governed and controlled by the run-time executive 40.

The blackboard 32 also supports solutions that are incremental and opportunistic among cooperative processes. Through the use of a blackboard 32, information to be processed can be posted, and each cooperating process can apply its technique to the problem. By using a blackboard 32, therefore, interface issues can be deferred until the interactions are resolved. The blackboard 32 thus serves to modularize and isolate functional expertise used to solve a problem, such as sensor fusion and data fusion as parts of the fuel mass determination in the preferred embodiment.

The Run-Time Executive

The run-time executive 40 activates all processes in all layers. The run-time executive 40 schedules data collection and data processing based on processing times and periods selected during start-up of the system.

The Determination Layer

The determination layer of software objects 20 provides the application code necessary to perform system specific operations within the embedded computer system. In the preferred embodiment, the application code needed to determine fuel mass in an airborne fuel tank (not shown) reside within the determination layer 20. Intermediate results from processes executed within the application code are posted to the blackboard 32 in the manner described above to be accessed and shared by all (relevant) processes.

Implementation

The various layers of the software architecture are preferably composed of software objects. These objects are physical or logical entities that have well defined characteristics. Objects thus represent key system components. Examples of physical objects in a fuel measurement system include various sensors such as accelerometers and transducers. Logical objects can also constitute real world logical entities, such as representation of a flight profile in terms of pitch and roll characteristics. Examples of non-real world objects specifically useful for fuel gauging systems include lists, vectors and matrices, to name a few. An abstract sensor object, with generic sensor characteristics and a full set of sensor options, is another example of a non-real world object that enhances this particular programming model.

Use of an object-oriented development approach makes it easier for the programmer to iterate during development and also to maintain software because the data, and any operations on the data, are localized within an object. As those skilled in the art will appreciate, object-oriented software also supports reuse by the separation of system entities. Thus, each entity is not only capable of reuse or portability, but can also be further developed or modified as needed depending on the development or enhancement of any particular system. The presently preferred source code written in the Ada computer language for the software objects described herein is provided in the Microfiche Appendix, the contents of which are expressly incorporated herein by reference.

Layering the system architecture allows separation of the concerns of the various models within the system architecture. Separation of concerns further allows isolation of critical responsibilities of the system. The "lower" layers of the architecture serve to abstract the system from the environment and provide common services needed for "higher" layers to perform their operations. In this manner, lower layers are seen as layers that abstract real world physical entities, such as electronics, sensors, processors and airframe components. Higher layers conversely abstract non-real world aspects such as sensor fusion and fuel mass determination.

The software architecture described above is intended to meet the domain needs of the system as well as critical software quality factors dictated by the Federal Aviation Administration ("FAA"). The presently preferred domain is that of an embedded signal processor for an airborne fuel management subsystem. The architecture not only meets those domain needs, but is also capable of application as a generalized inference engine. Through the software architecture, a number of domain characteristics and advantages have been identified. For example, merged technologies can be system tested and certified by the FAA. Support for multiple state estimation algorithms and separation of inputs from fuel mass determination processing provides important levels of redundancy (i.e., the system is tolerant of lost inputs) and improves fault tolerance within the system. The ability to introduce new and complex estimation techniques also provides for improved accuracy without compromising safety. Thus, simpler and less accurate algorithms can be run in tandem in order to validate results during real-time processing. The system is also reusable, in whole or in part, thus providing improved long term affordability and efficiency.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

We claim:

1. A virtual airframe layer of software objects embeddable in an aircraft subsystem and operative to adapt the aircraft subsystem to different airframe platforms, said virtual airframe layer comprising:

a resource data manager operative to receive from an external source adaptation and configuration data for a specific airframe platform in which the aircraft subsystem is to be embedded and to initialize and reconfigure the aircraft subsystem to said specific airframe platform utilizing said received data;

a bus item operative to communicate common bus data to and from the airframe layer; and a common sensor operative to receive data from at least one physical airframe sensor and operative to communicate sensor data and features to and from the airframe layer.

2. The virtual airframe layer of software objects defined in claim 1, wherein the bus item communicates common bus data between the airframe layer and a virtual processor layer of software objects embeddable in the aircraft subsystem and operative to adapt the aircraft subsystem to different computer systems.

3. The virtual airframe layer of software objects defined in claim 2, wherein the common bus data is communicated over an interface that is standard to the different computer systems.

4. The virtual airframe layer of software objects defined in claim 1, wherein the sensor data and features is communicated over a standard interface.

5. A virtual airframe layer of software objects defined in claim 1, wherein the sensor data and features are communicated to and from the airframe layer via a bus.

6. The virtual airframe layer of software objects defined in claim 5, wherein the bus is coupled to an embedded aircraft subsystem.

7. The virtual airframe layer of claim 1 wherein the external source comprises a storage device.

8. The virtual airframe layer of claim 1 coupled to and controlled by a run-time executive.

9. The virtual airframe layer of claim 1 wherein the aircraft subsystem comprises a distributed software architecture.

10. The virtual airframe layer of claim 1 operative to abstract physical airframe components of the different airframe platforms.

11. The virtual airframe layer of claim 1 wherein the common sensor is operative as a common sensor for sensor data and features within an airframe.

* * * * *